United States Patent [19]

Henry

[11] Patent Number: 4,878,697
[45] Date of Patent: Nov. 7, 1989

[54] COMPRESSION COUPLING FOR PLASTIC PIPE

[75] Inventor: Ralph E. Henry, Rixford, Pa.

[73] Assignee: Dresser Industries, Inc., Dallas, Tex.

[21] Appl. No.: 108,144

[22] Filed: Oct. 14, 1987

[51] Int. Cl.⁴ ............................................. F16L 33/18
[52] U.S. Cl. .................................... 285/250; 285/322; 285/348; 285/423
[58] Field of Search ............... 285/348, 323, 322, 249, 285/250, 255, 340, 423

[56] References Cited

U.S. PATENT DOCUMENTS

| | | |
|---|---|---|
| 1,743,315 | 1/1930 | Callender . |
| 2,228,018 | 1/1941 | Scholtes ................. 285/84 |
| 2,339,771 | 1/1944 | Davies ................... 285/166 |
| 2,452,277 | 10/1948 | Woodling ............... 285/122 |
| 2,470,546 | 5/1949 | Carlson ................. 285/166 |
| 2,644,700 | 7/1953 | Woodling ............... 285/122 |
| 3,083,041 | 3/1963 | Owenmark ............... 285/7 |
| 3,248,135 | 4/1966 | Meripol ................. 285/323 |
| 3,365,219 | 1/1968 | Nicolous ............... 285/340 |
| 3,498,647 | 3/1970 | Schroder ............... 285/343 |
| 3,545,794 | 12/1970 | Wise ..................... 285/248 |
| 3,563,575 | 2/1971 | Sanford ................ 285/323 |
| 3,591,208 | 7/1971 | Nicolaus ............... 285/250 |
| 3,596,933 | 8/1971 | Luckenbill ............. 285/94 |
| 3,679,241 | 7/1972 | Hoffmann .............. 285/340 |
| 3,756,632 | 9/1973 | Riggs et al. .......... 285/250 |
| 3,814,466 | 6/1974 | Leopold, Jr. .......... 285/55 |
| 3,843,169 | 10/1974 | Wise ................. 285/322 X |
| 3,888,519 | 6/1975 | Smith et al. .......... 285/55 |
| 3,977,704 | 8/1976 | Meyer .................... 285/27 |
| 3,986,731 | 10/1976 | DeHoff .................. 285/81 |
| 3,989,283 | 11/1976 | Pepper ................. 285/323 |
| 4,008,911 | 2/1977 | Kiyooka et al. ....... 285/249 |
| 4,062,572 | 10/1977 | Davis .................... 285/55 |
| 4,068,866 | 1/1978 | Saha . |
| 4,107,452 | 8/1978 | Razvi ................... 174/84 S |
| 4,256,335 | 3/1981 | Nielsen, Jr. .......... 285/250 |
| 4,335,908 | 6/1982 | Burge .................. 285/250 |
| 4,488,741 | 12/1984 | Conley et al. ........ 285/250 |
| 4,569,542 | 2/1986 | Anderson et al. . |
| 4,637,636 | 11/1987 | Guest ................. 285/323 X |
| 4,712,813 | 12/1987 | Passerell ............ 285/323 X |

FOREIGN PATENT DOCUMENTS

| | | |
|---|---|---|
| 1382489 | 11/1964 | France . |
| 605078 | 7/1948 | United Kingdom ........ 285/322 |
| 811384 | 8/1957 | United Kingdom . |
| 896359 | 8/1959 | United Kingdom . |
| 914971 | 6/1961 | United Kingdom . |
| 1267007 | 7/1970 | United Kingdom . |

Primary Examiner—Dave W. Arola

[57] ABSTRACT

A coupling is provided for joining segments of plastic pipe. The coupling includes a body portion having an inner bore opening to an enlarged outer bore. A metal stiffener tube having a flange at one end is inserted into the bore of the body until the flange contacts an internal stop. An elastomeric gasket encircles the stiffener. A flexible spring washer encircles the stiffener and contacts the outside end of the gasket. A grip ring, comprising a frustoconical radially outer surface, an inner surface with gripping members, a segmented lateral slot, and a resilient lip around one end, encircles the stiffener so that the lip is in contact with the spring washer. A connecting nut having a frustoconical bore for mating with the outside surface of the grip ring surrounds the stiffener and engages the enlarged bore of the body. The plastic pipe is inserted into the bore and around the stiffener. Tightening of the connecting nut into the enlarged bore causes axial movement and radial compression of the grip ring around the pipe and compression of the gasket by axial force of the nut and the compressed lip of the grip ring against the flexible spring washer. The compressed gasket provides a seal between the bore of the body and the outer surface of the plastic pipe. The flexed spring washer maintains compressive force on the gasket to compensate for component and pipe tolerances and tensile stress on the pipe.

9 Claims, 1 Drawing Sheet

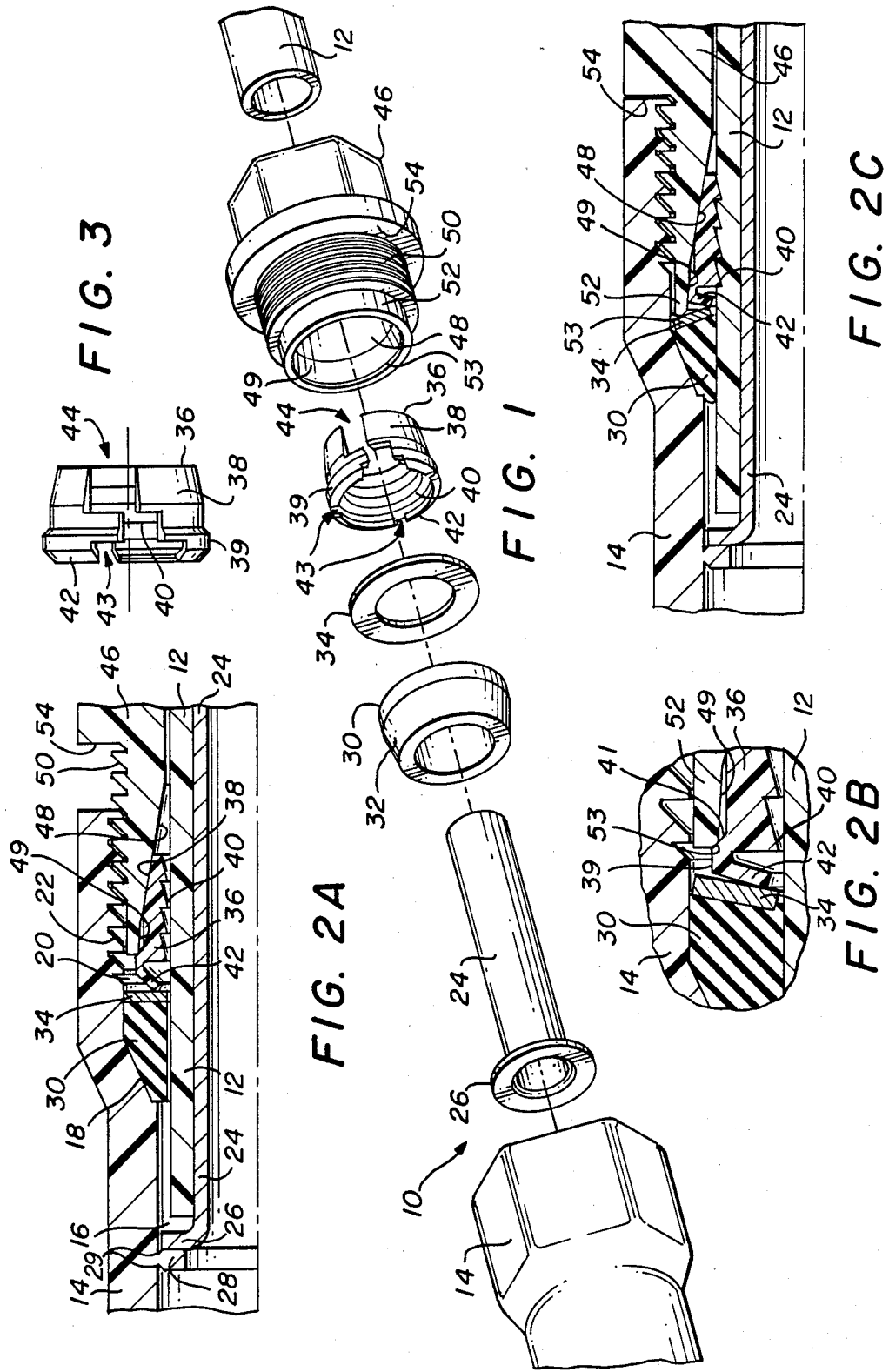

COMPRESSION COUPLING FOR PLASTIC PIPE

TECHNICAL FIELD

This invention relates to fittings for plastic pipe and, in particular, to an improved compression coupling for joining sections of plastic pipe.

BACKGROUND OF THE INVENTION

In fluid conveying systems which utilize plastic pipe, including natural gas distribution networks, segments of plastic pipe must be coupled with fittings capable of providing a reliable seal over a range of temperatures and pressures. Providing a reliable coupling for plastic pipe is difficult due to problems, such as stress, that cause fatigue, stretch, or failure of the plastic pipe and that result in leaking at the coupling from an inadequate seal. Couplings used in plastic pipe distribution systems must be able to withstand axial stresses, such as those caused by temperature induced length variations, without a decrease in their sealing capabilities. In addition, plastic pipe couplings should be easily connectable by ordinary workers, preferably without being totally disassembled in preparation for connection.

Plastic pipe couplings are currently available in many different functional configurations. The typical coupling includes a body portion into which an end of the plastic pipe is inserted. Generally, the coupling includes a metal tube which fits inside the plastic pipe to act as a stiffener for the pipe in the area where the pipe is gripped and sealed by the coupling. Inside the body portion of the coupling, and encircling the plastic pipe, are one or more elastic sealing rings or gaskets, one or more washers, and a grip ring for securing the plastic pipe in the coupling. A threaded nut surrounds the plastic pipe and engages corresponding threads on the body portion of the coupling. Tightening the nut with respect to the body portion forces the grip ring to compress radially inward to grip the plastic pipe, and either the grip ring, an extension of the nut, or both provide pressure to compress the elastic gasket to form a seal between the exterior surface of the plastic pipe and the interior of the body portion of the coupling.

Typical coupling designs utilize a grip ring that must be expanded radially during insertion of the plastic pipe so as to fit around and grip the pipe. This characteristic makes insertion of the pipe more difficult and creates a locking condition that prevents withdrawal of the pipe except by disassembling the coupling, even though the nut has not been tightened.

In couplings where the compression of the elastic gasket is provided solely by axial movement of the grip ring, it is possible for the grip ring to seize the pipe before the nut is completely threaded on the coupling. In this case, further axial advancement of the grip ring is prevented, and an inadequate seal may result due to low compression of the elastic gasket. Also, in cases where a proper seal has been established initially by action of the grip ring against the elastic gasket, a stretching of the pipe due to tensile stress may reduce the compression of the gasket and thus effectiveness of the seal.

In couplings where the elastic gasket is compressed solely by the action of the nut, the gasket can be fully compressed before the grip ring effectively grips the pipe. This problem can occur in couplings that provide a fixed-volume recess for the gasket between a body shoulder and a rigid washer and/or that provide a stop to limit tightening of the nut. Furthermore, fixed-volume recesses and stops that limit compression of the gasket can result in undercompression of the gasket due to dimensional variations from manufacturing tolerances of the pipe and components of the coupling.

Thus, there is a need for an improved coupling for plastic pipe that is easy to connect and that provides a reliable seal, even with component dimensional variations and/or stretching of the pipe due to axial stress.

SUMMARY OF THE INVENTION

The present invention is an improved compression coupling for joining sections of plastic pipe or conduit. The pipe coupling provides a reliable seal that compensates for conditions such as pipe wall thickness variations and stretching of the pipe due to axial stress. Furthermore, the coupling is easily connected with simple tools and without being disassembled prior to connection.

The coupling of the present invention includes a body portion having an inner bore for receiving an end of plastic pipe or conduit. The body includes a sloped transition surface opening from the inner bore to an enlarged outer bore having internal threads for mating with external threads of a connecting nut. A stiffener, such as a metal tube having a flange at one end, is inserted into the bore of the body until the flange contacts a stop in the bore. An elastomeric gasket having a frustoconical outer surface is inserted into the bore so as to conform to the sloped transition surface where the inner bore opens to the enlarged bore. A grip ring having a frustoconical radially outer surface and an inner surface with gripping members is provided for gripping the pipe and for transferring compressive force to the gasket. The grip ring of the present invention is constructed so as not to grip the plastic pipe until tightening of the nut initiates gripping engagement with the pipe. A resilient means, which may comprise a flexible spring washer in combination with a resilient lip around one end of the grip ring, is disposed between the gasket and the grip ring in the body to apply compressive force against the gasket. The connecting nut has an interior frustoconical bore for mating with the outer surface of the grip ring as the external threads of the nut engage the internal threads of the enlarged bore of the body.

To connect an end of plastic pipe to the coupling, the end of the plastic pipe is inserted through the bore of the nut and into the body of the loosely assembled coupling. The plastic pipe fits around the stiffener and within the inner bore of the body. As the coupling nut is tightened it forces the grip ring axially against the resilient means which applies compressive force to the elastomeric gasket. The grip ring includes a lateral slot along its length so that as tightening progresses the nose of the nut rides over a shoulder of the grip ring to force a first gripping member of the grip ring radially into gripping contact with the plastic pipe. When the nut is fully tightened into the body, the frustoconical bore of the nut compresses the grip ring radially so that the remaining gripping members engage the pipe, and the nose of the nut extends beyond the grip ring to apply compressive force to the gasket. Compression of the gasket provides a seal between the outer surface of the plastic pipe and the inner surface of the body. The force of the nose of the nut against the periphery of the flexible spring washer allows the washer to flex or "dish" so as to adjust gasket volume and control sealing pressure to compensate for dimensional variations in the components of the coupling. The flexible spring washer also compensates for cavity volume changes due to temperature variations or "creep" of the pipe material. Any pull-out movement or stretching of the pipe causes the grip ring to tighten its grip on the pipe as it moves into the frustoconical bore of the nut without any significant reduction of gasket sealing pressure.

BRIEF DESCRIPTION OF THE DRAWINGS

For a more complete understanding of the present invention and for further advantages thereof, reference is now made to the following Description of the Preferred Embodiment taken in conjunction with the accompanying Drawings, in which:

FIG. 1 is an isometric view of the components of a disassembled coupling of the present invention;

FIG. 2A is a partial longitudinal cross section of a loosely assembled coupling of the present invention;

FIG. 2B is a partial longitudinal cross section of the coupling with the connecting nut partially tightened;

FIG. 2C is a partial longitudinal cross section of the coupling with the connecting nut fully tightened; and FIG. 3 is a side plan view of the grip ring of the present invention.

DESCRIPTION OF THE PREFERRED EMBODIMENT

Referring to the Drawings, wherein like reference numerals designate like or corresponding parts throughout the several views, the plastic pipe coupling of the present invention is disassembled in FIG. 1 to show the various components of the coupling in perspective. FIG. 2A is a partial longitudinal cross section of the coupling showing the components in their loosely assembled positions.

Referring to FIGS. 1 and 2A, reference numeral 10 generally indicates the coupling of the present invention for joining a section of plastic pipe or conduit 12. Coupling 10 includes a body portion 14 having an inner bore 16 and a sloped transition surface 18 opening to an enlarged outer bore 20 having internal threads 22. A stiffener 24, such as a metal tube having a flange 26 at one end, is inserted into bore 16 of body 14 until flange 26 contacts a stop 28 inside body 14. An elastomeric ring or gasket 30 is inserted into body 14 to encircle the stiffener 24. Gasket 30 has a frustoconical surface 32 that conforms to the sloped surface 18 between bores 16 and 20 of body 14. A grip ring 36 having a frustoconical outer surface 38 and an inner surface with a plurality of gripping members 40 is inserted into body 14 so that grip ring 36 encircles stiffener 24. A resilient means, which may comprise a flexible spring washer 34 and a circumferential resilient lip 42 around one end of grip ring 36, is disposed between gasket 30 and grip ring 36 to apply axial force against gasket 30. Resilient lip 42 may comprise a plurality of segments separated by slots 43 to provide the desired resiliency and compressive force against spring washer 34 to compress gasket 30. Grip ring 36 includes a lateral slot 44 that allows grip ring 36 to be compressed radially inward. As shown in FIGS. 1 and 3, slot 44 may comprise two or more offset segments or notches designed to keep grip ring 36 and its gripping members 40 aligned as it is compressed radially. A connecting nut 46 having a bore with a frustoconical inner surface 48 is inserted into body 14 so that inner surface 48 mates with outer surface 38 of grip ring 36. Connecting nut 46 includes exterior threads 50 for mating with interior threads 22 of body 14 and a stop 54 which abuts the end of body 14 when nut 46 is fully tightened into body 14.

An end of plastic pipe 12 may be connected to coupling 10 when coupling 10 is in the loosely assembled position illustrated in FIG. 2A. Pipe 12 is simply inserted around stiffener 24 and into bore 16 of body 14. The outer diameter of stiffener 24 is dimensioned to fit inside the inner diameter of pipe 12. In addition, inner bore 16, gasket 30, washer 34, and grip ring 36 are dimensioned to receive pipe 12 between their inner surfaces and stiffener 24. After pipe 12 is inserted into coupling 10, the connection is made secure simply by tightening connecting nut 46 into body 14.

Coupling 10 has an opposite end with the same components as illustrated in the FIGURES but assembled in mirror image. When using coupling 10 to splice a damaged section of pipe 12, it may be advantageous to be able to slide pipe 12 entirely through body 14 of coupling 10. As shown in FIG. 2A, stop 28 includes V-grooves 29 that allow stop 28 to be broken away and removed from body 14 so that pipe 12 can extend through body 14.

To use coupling 10 for splice-in applications, a continuous length of pipe 12 is cut at the damaged area and nut 46, grip ring 36, washer 34, gasket 30, and stiffener 24 are removed from each end of coupling 10 and placed over the respective ends of the cut pipe 12 in proper order. Empty body 14 may be placed on end on a rigid surface and a six-inch length of scrap pipe may be inserted into the top of body 14 and struck with a hammer to break away stop 28. The cut ends of pipe 12 may be misaligned slightly so that body 14 may be inserted entirely onto one end of the cut pipe 12. The ends of cut pipe 12 may then be realigned with body 14 centered over the cut area and with gasket 30, washer 34, grip ring 36, and nut 46 inserted and tightened into each end of body 14 to complete the splice.

Connecting nut 46 comprises an extension or nose 52 that may include an inner surface 49 having a lesser slope than that of surface 48 and a bevel 53 around its inner rim. Grip ring 36 includes an annular shoulder 39 between lip 42 and surface 38. Annular shoulder 39 includes a ramp 41 rising from surface 38 to shoulder 39 at a slope greater than that of surface 38.

As connecting nut 46 is tightened initially, bevel 53 of nose 52 engages ramp 41 of shoulder 39 to provide axial force to urge grip ring 36 axially toward gasket 30 as shown in FIG. 2B. Nose 52 engages shoulder 39 because of the natural tendency of grip ring 36 to expand radially outward to its relaxed position. FIG. 2B illustrates the configuration of coupling 10 as nose 52 is about to ride over shoulder 39. As lip 42 contacts the inside diameter of spring washer 34, convex dishing of washer 34 occurs which concentrates the loading at the inside diameter of gasket 30 and aids in sliding the inside diameter of gasket 30 relative to pipe 12 for packing the gasket.

As nut 46 is tightened further, bevel 53 rides up ramp 41 allowing nose 52 to force annular shoulder 39 radially inward and drive a first gripping member 40 into plastic pipe 12. This action by nose 52 on shoulder 39, in conjunction with the action of surface 48 on surface 38, compresses grip ring 36 radially inward so that the plurality of gripping members 40 engage the outer surface of pipe 12. The segmented or notched slot 44 of grip ring 36 described above acts to maintain alignment of gripping members 40 as grip ring 36 is compressed radially to avoid a screw-effect by grip ring 36 on pipe 12 as nut 46 is tightened around grip ring 36.

FIG. 2C illustrates coupling 10 in the fully connected position. With connecting nut 46 tightened into body 14, nose 52 extends axially beyond lip 42 to retain flexible spring washer 34 and maintain compression on gasket 30. The action of nose 52 causes the radially outer portion of spring washer 34 to flex into gasket 30 so that spring washer is flexed into a concave position as shown in FIG. 2C. This action of spring washer 34 concentrates the final tightening load at the outside diameter of gasket 30 and aids in sliding the outer surface of gasket 30 relative to the bore surfaces for packing gasket 30. The action of spring washer 34 that concentrates loading first at the inside then the outside diameter of gasket 30 is a feature of the present invention that results in better packing of gasket 30 in its final position for improved sealing. The tendency of spring washer 34 to return to its unflexed (i.e. flat) position shown in FIG. 2A provides a continuous compressive force on gasket 30 to maintain gasket packing pressure against pipe 12. Flexible spring washer 34 provides an advantage over rigid washers in that the compressive force on gasket 30 supplied by flexed spring washer 34 compensates for component dimensional variations, cavity volume changes due to temperature variations, and creep of the pipe material.

Connecting nut 46 may be tightened until stop 54 abuts the end of body 14. In the fully tightened position of nut 46, pipe 12 is engaged by gripping members 40 of grip ring 36 while lip 42 and flexed spring washer 34 apply compressive force to gasket 30. The compression of gasket 30 by nose 52, lip 42, and flexed spring washer 34 provides a seal between the surfaces of bores 16, 18, and 20 of body 14 and the outer surface of pipe 12. The force applied by nose 52, compressed lip 42, and flexed spring washer 34 on gasket 30 maintains compression of gasket 30 to compensate for dimensional variations due to component and pipe tolerances and for axial movement of grip ring 36 away from gasket 30 due to partial pull-out or stretch of pipe 12. Thus, compression of gasket 30 is provided by the combined force of nose 52, compressed lip 42, and flexed spring washer 34 on gasket 30. Furthermore, spring washer 34 maintains compressive force on gasket 30 even if grip ring 36 is pulled slightly away from gasket 30 by axial stress on pipe 12.

Whereas the present invention has been described with respect to a specific embodiment thereof, various changes and modifications may be suggested to one skilled in the art, and it is intended that the present invention encompass such changes and modifications as fall within the scope of the appended claims.

I claim:

1. A compression coupling for plastic pipe, comprising in combination:
   a body having an enlarged bore and a sloped transition surface narrowing to an inner bore, said bores extending along a longitudinal axis of said body and said enlarged bore having internal threads;
   a rigid stiffener having a flange at one end thereof with said flange end inserted into said inner bore;
   an elastomeric gasket, having an axially outer end, encircling said stiffener and compressible in said body, said gasket having a sloped radially outward surface, and said sloped radially outward surface conforming to said sloped transition surface between said bores of said body;
   a flexible spring washer encircling said stiffener for contacting said gasket at its axially outer end;
   a grip ring encircling said stiffener and having a frustoconical radially outward surface, a radially inward surface having a plurality of inwardly projecting means for gripping, a lateral slot, and a resilient lip for axially compressive contact with said spring washer; and
   a connecting threaded nut encircling said stiffener and having external threads for engagement with said internal threads of said enlarged bore, said nut having an axially extending nose and a frustoconical bore for mating with said outward surface of said grip ring, said pipe inserted in said bores and around said stiffener, axial movement of said nut as said nut is threaded into said body causing axial movement of said gasket, said spring washer and said grip ring toward the transition surface of the body, resulting in radial compression of said grip ring around said pipe and compression of said gasket by axial force of said nose and said resilient lip against said spring washer, said sloped radially outward surface of said gasket mating with said transition surface of said body forming a seal.

2. The compression coupling of claim 1, wherein said grip ring includes an annular shoulder projecting radially outward from said grip ring between said resilient lip and said frustoconical surface.

3. The compression coupling of claim 2, further comprising:
   an annular ramp joining said frustoconical surface and said shoulder of said grip ring; and
   a bevel on said nose of said nut for engaging said ramp of said grip ring during initial tightening of said nut.

4. The compression coupling of claim 1, wherein said lateral slot of said grip ring comprises a plurality of offset segments to maintain alignment of said plurality of gripping means during compression of said grip ring.

5. The compression coupling of claim 1, wherein said resilient lip comprises a plurality of lip segments spaced circumferentially around an end of said grip ring.

6. The compression coupling of claim 5, wherein said resilient lip and said spring washer coact to maintain contact of said spring washer with said gasket when the pipe is under tensile stress.

7. A compression coupling for connecting a segment of plastic pipe, comprising:
   a body having an enlarged bore and a sloped transition surface narrowing to an inner bore, said bores extending along a longitudinal axis of said body and said enlarged bore having interior threads;
   a rigid stiffener having a flange at one end thereof with said flange end inserted into said inner bore;
   an elastomeric gasket, having an axially outer end, encircling said stiffener and compressible in said body, said gasket having a sloped radially outward surface, and said sloped radially outward surface conforming to said sloped transition surface between said bores of said body;
   a flexible spring washer encircling said stiffener inserted into said body for contacting said gasket at its axially outer end;
   a grip ring encircling said stiffener and having a frustoconical radially outward surface, a radially inward surface comprising a plurality of inwardly projecting means for gripping, a lateral slot having a plurality of offset segments, a segmented resilient lip around one end of said grip ring for providing axially compressive force against said spring washer, and an annular outwardly projecting shoulder between said lip and said frustoconical surface; and a connecting threaded nut encircling said stiffener and having external threads for engagement with said internal threads of said enlarged bore, said nut having an axially extending nose and a frustoconical bore for mating with said outward surface of said grip ring, said pipe inserted in said bores and around said stiffener, axial movement of said nut, as said nut is threaded into said body causing axial movement of said gasket, said spring washer and said grip ring toward the transition surface of the body, resulting in radial compression of said grip ring around said pipe and compression of said gasket by axial force of said nose and said resilient lip against said spring washer, said compressed gasket forming a seal between said pipe and said bores, said sloped radially outward surface of said gasket mating with said transition surface of said body forming a seal, and said lip and said spring washer maintaining compressive force against said gasket when said pipe is under tensile stress.

8. The compression coupling of claim 7, further comprising:

an annular ramp joining said frustoconical surface and said shoulder of said grip ring; and a bevel on said nose of said nut for engaging said ramp of said grip ring during initial tightening of said nut.

9. In a coupling for plastic pipe, including a body with a longitudinal bore for receiving the pipe, an elastomeric gasket for providing a seal between the body and the pipe, a means for gripping the pipe, and a connecting nut for securing the pipe, elastomeric gasket and the means for gripping the pipe, to the body thus forming the coupling, the improvement comprising:

a flexible resilient means between the gasket and connecting nut for compressing the gasket; and means for flexing such resilient means to provide continuous compressive force of said gasket to maintain the seal, wherein said means for flexing comprises:

a first means for flexing a radially inward portion of said resilient means into compressive contact with the gasket to provide an initial seal; and a second means for flexing a radially outward portion of said resilient means into compressive contact with the gasket to provide and maintain a full seal, wherein;

said resilient means comprises a flexible spring washer contacting the gasket;

said first means comprises a resilient lip around an end of the gripping means in contact with said spring washer; and said second means comprises an extension of the connecting nut in contact with said spring washer.

* * * * *